Oct. 14, 1969   H. R. HELLSTROM   3,472,367
QUICK-OPENING PACKAGE
Filed May 1, 1968   2 Sheets-Sheet 1

INVENTOR
Harold Richard Hellstrom.
BY
HIS ATTORNEYS

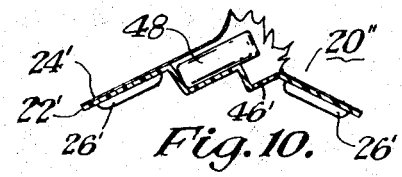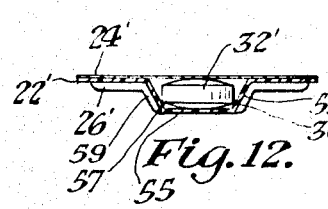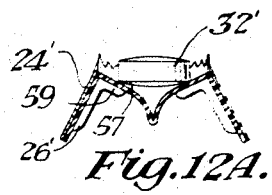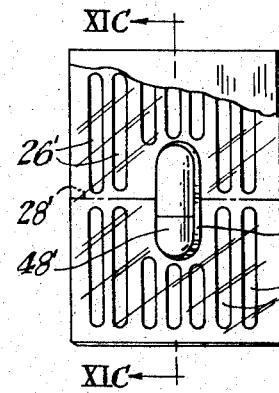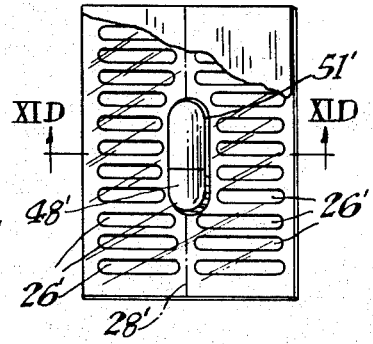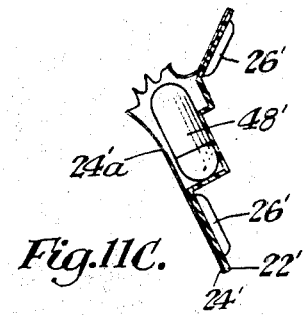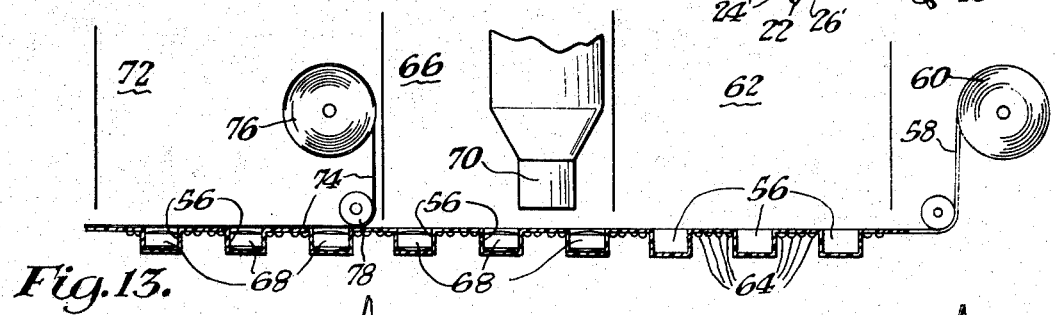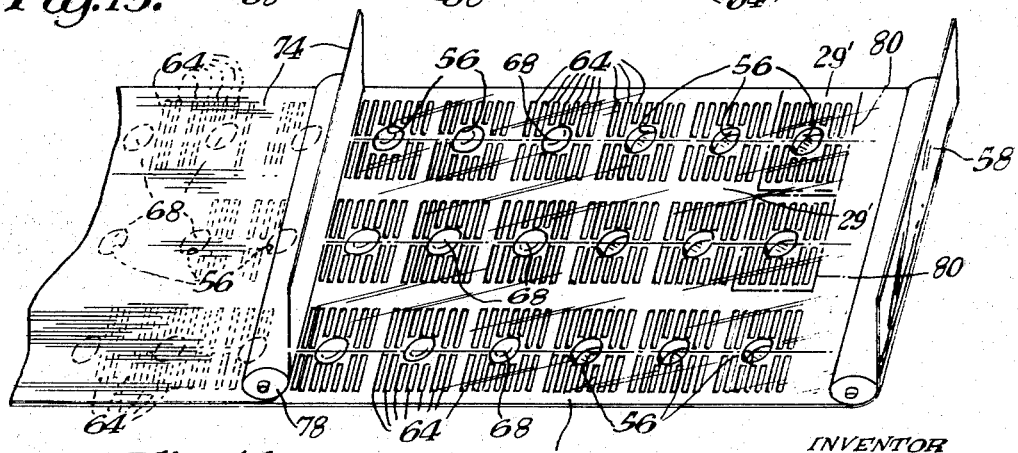

3,472,367
QUICK-OPENING PACKAGE
Harold Richard Hellstrom, 5245 Center Ave.,
Pittsburgh, Pa. 15232
Filed May 1, 1968, Ser. No. 725,610
Int. Cl. B65d 17/24
U.S. Cl. 206—56                                    16 Claims

ABSTRACT OF THE DISCLOSURE

I disclose a quick-opening package comprising a relatively stiff supporting layer, at least one pocket formed in said supporting layer, a frangible backing layer adhered to said supporting layer for enclosing an item contained in said pocket, and means forming part of said supporting layer for angulating portions of said supporting layer generally away from the opening of said pocket to distort the pocket opening or a wall of the pocket and to rupture said backing layer directly or to cause the item partially or completely to be ejected through the frangible layer.

---

This application is an improvement upon my co-pending application entitled "Individualized Dispensing Packages," filed Mar. 27, 1968, Ser. No. 716,554.

The present invention relates to a quick-opening package and more particularly to individualized or compartmentalized packages capable of being opened with one hand of the user.

The merits of a quick-opening package, particularly one which can be opened with one hand, have been elaborated upon in detail in my aforementioned co-pending application. Briefly, these include the avoidance of dropping or otherwise contaminating the contained item, dispensing the item directly into the patient's or other user's hand or mouth, dispensing the item directly into a water tumbler or other container held by the patient or by an individual administering to him, and the presence of a relatively flat surface for labeling purposes. Additionally, fumbling for strings, tapes, tear slits and other opening "aids" is avoided.

The individualized packages disclosed in my co-pending application for the most part resulted in a relatively large expanse of unsupported frangible membrane. While this is not a disadvantage in many applications, for very small items such as certain pills or capsules, the membrane structure dictates a minimum distance between items within a strip package or similar compartmented package. Additionally, in the case of frangible or easily crushed items, the relatively stiff backing member required molding thereof to a particular shape or the use of auxiliary components in the package for the protection of the item.

With my present invention, I overcome these disadvantages by providing a novel individualized or compartmentalized package which can be manipulated with the fingers of one hand in opening the package or individual compartments thereof. This is accomplished by providing a relatively thick supporting layer having a number of pockets therein. The supporting layer can be a relatively rigid cardboard or plastic. Alternatively, a relatively thick membrane or blister material can be used which can be stamped or otherwise formed with one or more pockets or blisters in the membrane. In any event portions of the supporting member can be angulated away from the pocket opening to distort the opening and rupture the frangible backing layer mentioned below. Means are provided for stiffening the membrane such that portions of the membrane can be so angulated. Desirably, the angulation fold line passes through the pocket or blister. In a compartmentized package of this character, one or more fold lines can be established, with each fold line passing through a number of closely adjacent pockets or blisters.

After one or more items are placed in the pocket or pockets of the supporting material, a frangible backing layer is secured to the material and desirably sealed about the one or more compartments or pockets of the material. As the pockets closely receive the items, only a relatively small proportion of the frangible backing is unsupported. In the case of the usual shape of tablets or pills or the like, the depth of the pocket or blister can be predetermined such that the major proportion of this otherwise unsupported area is disposed closely adjacent the surface of the pill to afford additional support for the backing layer. It is contemplated that the frangible backing layer can be provided with printed indicia conveying dosage or opening instructions. Where transparent membrane or blister material is utilized as the supporting layer, as is usually the case, the printing can be applied to the inward surface of the backing layer for visual access through the blister material and for preventing defacement thereof during shipment or handling.

When the aforedescribed supporting material is angulated across one or more of the aforementioned pockets the side walls of the pockets tend to spread or diverge, and distention of the pocket opening at least aids in rupturing the overlying membrane layer. In other applications, as where the pill or other small item is supported in the pocket closely adjacent the frangible backing member, the bottom wall of the pocket is folded toward the frangible backing and this fold pushes the pill or other item through the frangible backing layer. In still other arrangements the side walls of the pocket are strengthened and disposed for engaging and ejecting the item through the backing layer. Various means are provided for controlling the amount and placement of the forces generated by the pocket fold in order to predetermine the complete or partial dispensing of the item, as desired.

I am aware of a number of patents disclosing pill packages with frangible backing layers. For example, in Sparks 3,207,299 a two-cell package is folded between the cells to break the backing member. The Sparks package requires the use of two hands, and, moreover, a pair of pills or other items are exposed at one time.

On the other hand, Sorensen 2,317,860 and Hartman, Jr., 3,054,503 disclose compartmented or single packages wherein the blisters or pockets are shaped or constructed such that finger pressure thereon extrudes the pill through a frangible layer covering the otherwise open side of the blister or pocket. In addition to requiring a relatively large number of component parts, the patented packages appear to require the use of two hands.

I accomplish these desirable results by providing a quick-opening package comprising a relatively stiff supporting layer, at least one pocket formed in said supporting layer, a frangible backing layer adhered to said supporting layer for enclosing an item contained in said pocket, and means forming part of said supporting layer for angulating portions of said supporting layer generally away from the opening of said pocket to distort said opening and to rupture said backing layer.

I also desirably provide a similar package wherein said angulating means establishes a fold line through said pocket.

I also desirably provide a similar package wherein said pocket is shaped to produce an ejecting fold upon angulation of said supporting layer, said item being so spaced from said frangible layer that said fold ejects said item through said frangible layer.

I also desirably provide a similar package wherein a plurality of said pockets are formed, and said angulating means establishes at least one fold line extending through said pockets.

I also desirably provide a quick-opening package comprising a layer of relatively thick membrane material, at least one pocket formed in said material, and a frangible backing layer adhered to said material for enclosing an item contained in said pocket, and means for strengthening portions of said material, said strengthening means defining an angulation fold line extending between said portions and through said pocket.

During the foregoing discussion, various objects, features and advantages of the invention have been set forth. These and other objects, features and advantages of the invention, together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIGURE 8 is a cross sectional view taken generally along reference line VIII—VIII of FIGURE 7, while

FIGURE 10 is a similar view of the package of FIGURE 9 in its opened condition;

FIGURES 11A and 11B are top plan views illustrating additional means for controlling the dispensing characteristics of the package;

FIGURES 11C and 11D are cross sectional views of the packages of FIGURES 11A and 11B and taken along reference lines XIC—XIC and XID—XID thereof respectively;

FIGURES 12 and 12A are cross sectional views illustrating still another form of my novel package;

FIGURE 13 is a schematic production line illustrating the manufacture of one form of compartmentalized package of my invention; and FIGURE 14 is an isometric view of the package formed in FIGURE 12 and showing related steps in its manufacture.

Figure 1:
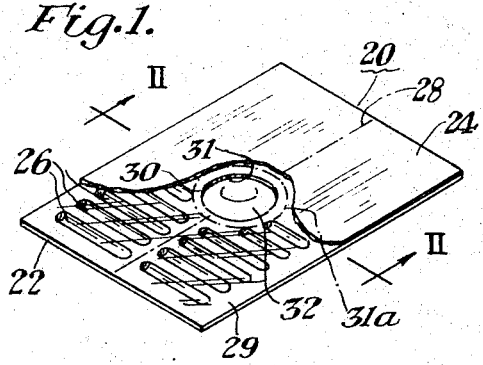
FIGURE 1 is an isometric view of one form of quick opening package made in accordance with my invention.
Figure 2:
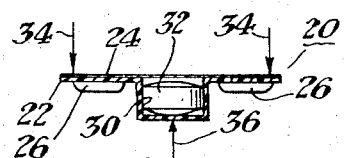
FIGURE 2 is a cross sectional view of the package as shown in FIGURE 1 and taken along reference line II—II thereof.
Figure 3:
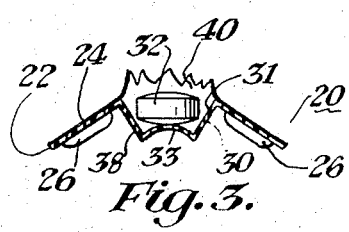
FIGURE 3 is a similar view showing the package in its opened position.

Referring now to FIGURES 1–3 of the drawings, the exemplary form of my novel package 20 shown therein includes a stiff or stiffened supporting layer including in this example a relatively thick membrane or blister material 22 covered as better shown in FIGURE 2 with a frangible backing member 24. The blister material 22 desirably is reinforced with a number of strengthening ribs, flutes or ridges 26 in order to ensure angulation of the blister material 22 along fold line 28. Desirably, the ridges 26 or other strengthening means terminate short of the edges of the package to afford an area 29 for sealing the layers 22, 24. The layers can be sealed by application of pressure sensitive adhesive to one of the layers, or by heat or solvent welding depending on materials forming the layers. Alternatively or in conjunction with the peripheral seal areas 29, a continuous smooth surface 31a can be afforded adjacent the pocket opening by terminating the ridges 26 short thereof.

The reinforcing structures 26, as better shown in FIGURES 13 and 14 of the drawings, can be applied to the blister material 22 at the same time that the one or more pockets 30 are formed therein. A relatively small item such as a pill 32 or the like is fitted in each pocket 30. Alternatively, the supporting layer 22 can be formed from cardboard or thick plastic and the ridges 26 omitted. In the latter case, the fold line 28 desirably denotes a crease or other line of weakening to determine the angulation fold.

As better shown in FIGURE 3 the blister material 22 is folded such that the line of angulation passes generally through the blister or pocket 30. The necessary forces to effect angulation of the blister material 22 are applied to the package 20 as denoted by arrows 34, 36 (FIGURE 2). This can be accomplished using the fingers of one hand, as set forth in my aforementioned application.

When the package 20 is angulated as shown in FIGURE 3, the fold line extending across the pocket 30 tends to spread the side walls 38 thereof which distorts pocket opening 31 and applies stretching forces to the frangible layer 34 which ruptures as denoted at 40. At this same time, depending on the height of the pocket 30, a fold 33 in the top wall of the pocket 30 can eject the item 32 at least partially through the backing layer 24.

Figure 4:
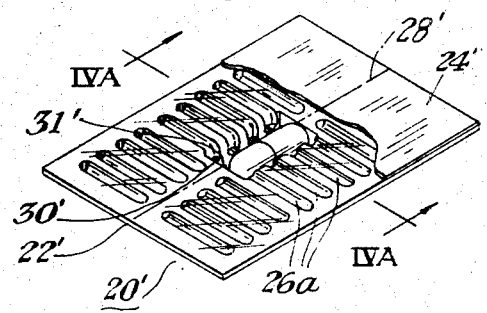
FIGURE 4 is a partial, enlarged isometric view of another form of my novel package structure.
Figure 4A:
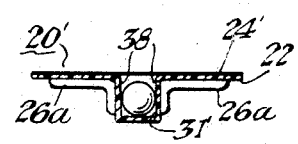
FIGURE 4A is a cross sectional view of the package as shown in FIGURE 4 and taken along reference line IVA—IVA thereof.

As better shown in FIGURES 4 and 4A such spreading or divergence of the side walls 38 can be enhanced by extending adjacent ones of the strengthening ribs or ridges 26A such that they open into and form part of the side walls 38'. This arrangement also facilitates the angulation of the pocket 30'.

Figure 5:
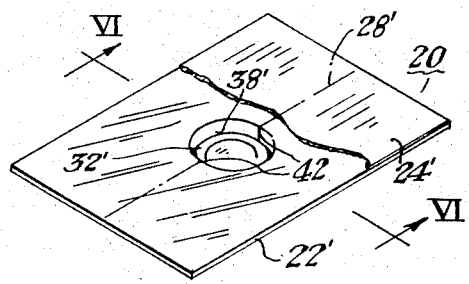
FIGURE 5 is an isometric view of still another form of my novel package.
Figure 6:
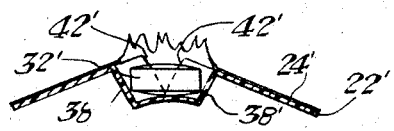
FIGURE 6 is a cross sectional view of the package as shown in FIGURE 5 and taken along reference line VI—VI thereof; but showing the package in its opened condition.

In FIGURES 5 and 6 of the drawings spreading of the pocket side walls 38' is facilitated by scoring the side walls as denoted by reference characters 42 at points where the side walls adjoin the fold line 28'. This causes the side walls 38 to split or rupture at 42' (FIGURE 6) when the supporting material 22' is angulated, resulting in increased distortion of the pocket opening to aid in rupturing the frangible backing 24'.

Figure 7:
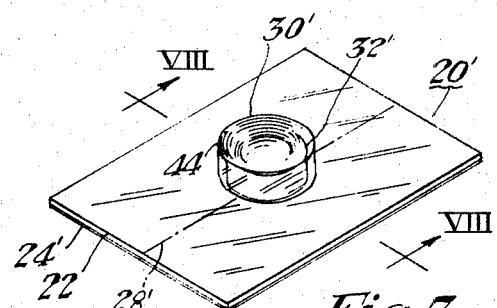
FIGURE 7 is an isometric view of still another form of my novel package construction.
Figure 8:
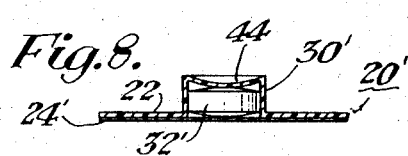
Figure 8A:
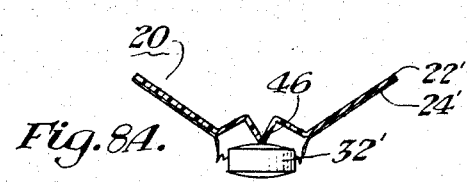
FIGURE 8A is a similar view showing the package in its opened condition.

The package 20' of FIGURES 7 and 8 utilizes a modified pocket structure 30' arranged to apply increased ejecting forces to the pill or other contained item 32' when the blister material is angulated. As better shown in FIGURE 7 one arrangement for so endowing the pocket 30' includes the provision of a concave top wall 44. The pocket 30' is made relatively shallow in this example so that the contained item 32' is supported relatively close to the frangible backing 24'.

When the package 20' is angulated as better shown in FIGURE 8 the concave top wall 44 becomes deeply folded at 46, and this fold projects the item 32' through the frangible backing.

Figure 9:
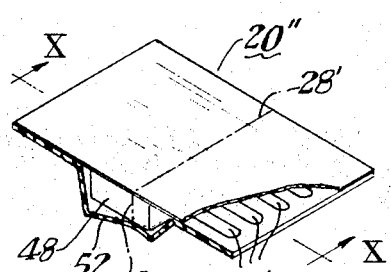
FIGURE 9 is a cross sectional view of still another form of my package and illustrating means for controlling the dispensation of elongated items therefrom.

The ejection feature of FIGURES 7 and 8 can be arranged to control the dispensing character of the package 20" as illustrated in FIGURES 9 and 10. Thus, in case of an elongated item such as capsule 48, the center 40 of concavity of top wall 52 is shifted toward one end of the capsule 48. Thus, upon angulation of the package 20" the aforementioned fold 46' is displaced toward one end of the capsule such that only that end of the capsule is projected through the frangible backing. The capsule 48, then can be removed with the fingers of the other hand or the opening hand can be used to shuck the capsule 48 out of the package without touching the capsule.

Desirably, the strengthening ridges 26' and the fold line 28' defined thereby are shifted such that the fold line 28' passes generally through the center 50 of concavity in the pocket top wall.

FIGURES 11A and 11B illustrate further means for controlling the dispensing characteristic of my novel package. In the case of elongated items such as capsules 48' reinforcing ridges 26' are extended generally parallel to the capsule 48' and its relatively closely fitting pocket or bubble 51'. The defined line of angulation 28' therefore extends transversely of the pocket 51' and item 48'. As better shown in FIGURE 11C the elongated item is partially retained by backing layer 24'a.

On the other hand extending the strengthening ridges 26' in the opposite direction (FIGURE 11B) defines an angulation line 28' extending longitudinally through the pocket 51'. Angulation of the package of FIGURE 11B therefore results in complete dispensing of the item 48', as better shown in FIGURE 11D.

FIGURES 12 and 12A show a similar packaging structure wherein the sidewalls 53 of the pocket 30' taper inwardly toward bottom wall 55 thereof. When the package is angulated for opening purposes, the bottom wall folds outwardly, while the side walls 53 engage adjacent edges 57 of the item 32' to cam the item toward and eject it through the frangible backing 24'. For this purpose, the pocket walls are strengthened by extending the flutes or ridges 26', or other strengthening means such as an external, suitably shaped plate, along the pocket walls 53, is denoted by ridge extensions 59.

It is contemplated that my novel package can be provided with a large number of pockets or compartments and that the package can be readily fabricated from a minimum of component parts by mass production techniques. Such techniques and resulting package 54 are illustrated in FIGURES 13 and 14 of the drawings. In this method, as better shown in FIGURE 13 a continuous strip of blister material 58 is payed off coil 60 to a first station 62 where pockets 56 and strengthening ribs or ridges 64 where required, are formed simultaneously in the strip 58 by conventional stamping equipment. Alternatively crease lines 28', where used, can likewise be formed simultaneously with pockets 56.

The strip 58 is then indexed to a second station 66 where pills 68 or other small items are fed from hopper 70. The strip 58 can be vibrated (or swept) at the station 66 to facilitate deposition of the items 68 in the pockets 56.

After this operation the strip 58 is indexed to a third station 72 where a frangible backing layer 74 is applied to the strip from coil 76. The frangible backing can be a metallic foil coated for example with pressure or heat sensitive adhesive and adhered by applicator roll 78. Alternatively, a coating of suitable adhesive can be first applied (not shown) to the strip 58 at a point upstream of the roll 78. It is also contemplated that the layer 74 can be heat-sealed to the strip 58. A plastic strip with one or more preferential lines of weakening provided in accord with my aforementioned application can also be used as the frangible layer 74.

In the disclosed arrangements of my novel quick-opening package, it will be seen that the pills, capsules, or other small items can be very closely spaced. The package 54 (FIGURE 14) can be employed in a strip dispenser or can be severed into lengths for use with sheath type envelopes or other cartons. Alternatively, the package can be severed (along seal areas 29') into discreet individualized units (denoted by chain lines 80 in FIGURE 14) having one or more pockets and items per unit.

From the foregoing it will be seen that I have disclosed novel, quick-opening packages that are amendable to mass production techniques but which can be utilized for individualized dosages. Most importantly, the one or more pockets of the package can be opened individually with the fingers of one hand. While I have shown and described certain presently preferred embodiments of the invention and have illustrated presently preferred methods of practicing the same.

I claim:
1. A quick-opening package comprising a layer of relatively thick membrane material, at least one pocket formed in said material, and a frangible backing layer adhered to said material for enclosing an item contained in said pocket, and means for strengthening portions of said material, said strengthening means defining an angulation fold line extending between said portions and through said pocket.

2. The combination according to claim 1 wherein said strengthening means include a plurality of ridges formed in said material and extending transversely from said fold line.

3. The combination according to claim 2 wherein those ridges juxtaposed to said pocket are extended along the side walls of said pocket to aid in distorting the opening of said pocket upon angulation of said material.

4. The combination according to claim 1 wherein said item is closely fitted within said pocket and the side walls of said pocket are substantially equal to the thickness of said item so that the adjacent portion of said backing member is supported by said item prior to angulation of said material and so that angulation of said material including said pocket ejects said item through said frangible backing layer.

5. The combination according to claim 1 wherein a wall surface of said pocket juxtaposed to said backing layer is of generally concave configuration relative to the outer surface of said package so that said wall surface becomes deeply folded upon angulation of said material to eject said item through said frangible layer.

6. The combination according to claim 5 wherein the center of concavity is eccentric of said pocket so that said fold engages an end portion of said item for partial ejection thereof.

7. The combination according to claim 1 wherein said pocket and said item are elongated and said strengthening means are arranged generally parallel of said pocket for defining a line of angulation transversely through said pocket.

8. The combination according to claim 1 wherein said pocket and said item are elongated, and said strengthening means extend generally normal to said pocket for defining an angulation line longitudinally through said pocket.

9. The combination according to claim 1 wherein said membrane material is transparent, said backing layer is opaque, and instructional indicia are enclosed therebetween for viewing through said material.

10. A quick-opening package comprising a relatively stiff supporting layer, at least one pocket formed in said supporting layer, a frangible backing layer adhered to said supporting layer for enclosing an item contained in said pocket, and means secured to one of said layers for angulating portions thereof generally away from the opening of said pocket to distort said opening and to rupture said backing layer.

11. The combination according to claim 10 wherein said angulating means establishes a fold line through said pocket.

12. The combination according to claim 11 wherein a plurality of said pockets are formed, and said angulating means establishes at least one fold line extending through said pockets.

13. The combination according to claim 11 wherein said pocket is shaped to produce an ejecting fold upon angulation of said supporting layer, said item being so spaced from said frangible layer that said fold ejects said item through said frangible layer.

14. The combination according to claim 10 wherein wall surfaces of said pocket are preferentially weakened adjacent the line of said angulation so that upon angulation of said supporting layer said walls rupture to increase the distortion of said pocket opening.

15. A quick-opening package comprising a relatively stiff supporting layer, at least one pocket formed in said supporting layer, a frangible backing layer adhered to said supporting layer for enclosing an item contained in said pocket, and means secured to one of said layers for angulating portions thereof generally toward said pocket and for distorting at least one wall portion of said pocket so that said wall portion ejects said item through said frangible layer.

16. The combination according to claim 10 wherein said angulating means terminate short of said pocket to form a continuous sealing area about said pocket and between said angulating means and said pocket.

References Cited
UNITED STATES PATENTS

| 3,207,299 | 9/1965 | Sparks | 206—56 |
| 3,261,538 | 7/1966 | Jones et al. | 229—89 |

JAMES B. MARBERT, Primary Examiner

U.S. Cl. X.R.

206—38